May 10, 1927.
T. S. WATSON
1,627,942
AUTOMATIC GENERATING PLANT
Filed June 12, 1922
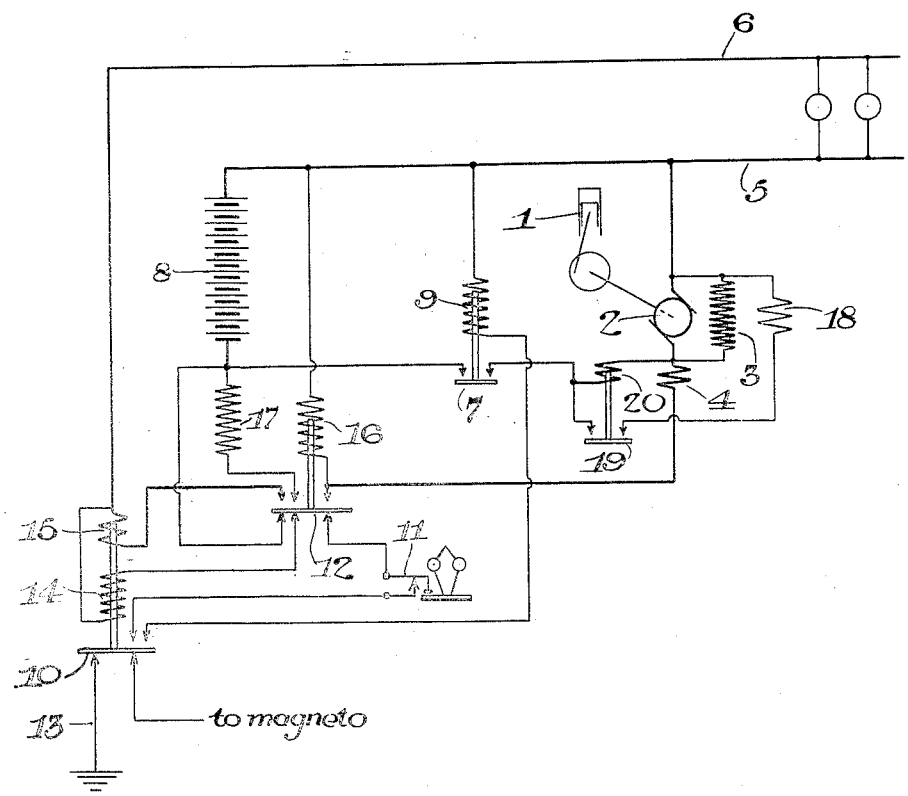
WITNESSES
INVENTOR
Thomas S. Watson
By R. S. Caldwell
ATTORNEY Patented May 10, 1927.

1,627,942

UNITED STATES PATENT OFFICE.

THOMAS S. WATSON, OF MILWAUKEE, WISCONSIN, ASSIGNOR TO KOHLER COMPANY, OF KOHLER, WISCONSIN, A CORPORATION OF WISCONSIN.

AUTOMATIC GENERATING PLANT.

Application filed June 12, 1922. Serial No. 567,734.

This invention has for its object to facilitate the starting of an automatic gas engine driven generator plant of the demand starter type by providing an auxiliary field winding on the generator through which a circuit is momentarily closed when it starts to act as a motor to increase the field strength and develop sufficient torque to quickly overcome the inertia of the idle unit and enable it to more promptly attain its cranking speed.

In the so-called farm lighting plants or independent generator units of the demand starting type, particularly those in which the generator serves as a motor supplied by a storage battery for cranking a gas engine, it is desirable to accelerate the starting operation. A heavy burden is imposed on the motor designed for generating purposes when it is called upon to crank the gas engine, especially in cold weather and particularly when the voltage supplied is very much less than the voltage developed by it as a generator. At such times greater energy is required to overcome the inertia and the increased resistance to starting. Without some provision for augmenting the starting torque, the cranking motor may slowly turn the engine shaft over a great many times before an explosion is obtained, whereas a few quick turns would have been sufficient. It is the purpose of the present invention to provide the motor with a momentarily strengthened field which will enable it to quickly overcome the inertia of the idle plant, but which will not be continued after such inertia is overcome so as to delay the attainment of the cranking speed.

With the above and other objects in view the invention consists in the automatic generating plant provided with the momentarily included auxiliary field winding as herein claimed and all equivalents.

The accompanying drawing is a diagram of circuits of an automatic generating plant constructed in accordance with this invention.

In this drawing the generating unit shown is one of a well known type now in commercial use, wherein a starting battery of lower voltage than the generator is employed, and briefly consists of a gas engine 1, driving the armature 2 of a compound wound generator having a shunt field 3 and a series field 4. One brush of the generator armature is connected directly with a service main 5 and the other, through the series field 4 and certain switch mechanism indicated in heavy lines and later described, to the other main 6.

Across the terminals of the generator armature, in a circuit controlled by a starting switch 7, is a storage battery 8, whereby the gas engine may be started with the generator operating as a motor. The solenoid coil 9 of starting switch 7 is also in circuit with the storage battery 8 and is controlled by three different switches in said circuit, including a control switch 10, a governor-operated switch 11, and a main switch 12. These switches are so related that the circuit through the starting switch solenoid 9 is only closed under the following conditions: When the control switch 10 is in its raised position, which is whenever there is a demand on the mains; when the governor which is driven by the engine is in an idle position, as when the engine is not operating or before it has attained running speed; and when the main switch is in its released or lower position, as when the generator is idle or before it develops the line voltage.

The control switch 10, besides closing the motor starting switch circuit in its upper position, serves to close a magneto ground circuit 13 in its lower position to render gas engine ignition ineffective when there is no longer demand for service on the mains.

The solenoid coil for the control switch consists of a winding 14 of fine wire with many turns and a winding 15 of coarse wire with few turns. The fine winding 14 is in series with the battery and the mains when the system is idle, so as to be energized by a weak current from the battery flowing through the mains and any translating device when the latter is thrown into circuit by connecting it across the mains. The series winding 15 is connected with the main 6 and through the switch 12 in its upper position with the series field 4. While the fine wire winding 14 is responsive to the very weak current flowing from the battery through the mains and translating device for lifting the control switch 10, the coarse wire winding 15 constitutes a current coil through which the generator current passes to the mains and is for the purpose of retaining the switch 10 in its raised position as long as the generator continues to supply a demand on the mains.

A solenoid coil 16 for lifting the main switch 12 is connected directly across the generator or between the series field 4 and the main line 5.

The main switch 12, besides closing a gap in the starting switch circuit in its lower position and besides closing the connection between the generator and the main line 6 in its upper position, serves in the latter position to close a recharging circuit for the battery through a resistance 17 to compensate for a difference between the battery voltage and the generator voltage.

While the circuit connections of the unit have thus been briefly outlined, with accompanying mention of functions performed, it may be well to describe the consecutive operations. With the system idle and all switches released, as shown, an automatic start is made upon the closure of the switch of any translating device across the mains, the battery being included in a circuit with the mains and the translating device and the fine wire winding 14 of control switch 10. This energizes coil 14 to lift switch 10 and remove the ground connection from the magneto, while at the same time closing the motor starting switch circuit from the battery through coil 9. The coil 9 being energized, closes the motor starting circuit to connect the battery directly with the generator to operate it as a motor for cranking the engine.

When the engine functions to drive the generator, the generator current passing through the coil 16 energizes it to lift switch 12, thereby opening the motor starting circuit through coil 9 and closing the generator service circuit between the generator and main line 6. As these two functions performed by switch 12 cause coil 15 to be energized at approximately the same time that the circuit through coil 14 is opened, switch 10 remains in its raised position and will continue so as long as current passes through coil 15, which means as long as a translating device remains connected across the mains.

Should there be a momentary interruption of the circuit for any reason, with a resumption of circuit connections before the engine speed is reduced below cranking speed, the break in the motor starting switch circuit caused by the open governor switch 11 avoids a closing of the motor starting circuit unnecessarily and so avoids a direct connection between the battery and the generator terminals while the generator is developing its higher voltage. The battery, however, remains in circuit with the generator during the operation of the latter with the charging resistance 17 in series therewith to cut down the generator voltage to approximately that of the battery.

When the demand for current supply on the mains ceases by the opening of the switch of the last translating device current ceases to flow through the series coil 15, which therefore permits the switch 10 to drop and ground the magneto circuit to stop the engine and thereby cause the release of switch 12 so that all parts are restored to their original positions and the unit comes to rest.

The accelerating means of this present invention consists of an auxiliary field winding which may be momentarily closed at the beginning of the starting operation to give the motor a strong field even though excited by the low voltage battery and thus develop a torque that will enable it to quickly overcome the inertia of the idle unit. Under the present invention any means may be employed for momentarily closing the circuit through such auxiliary field winding. As here shown the auxiliary field winding 18 is controlled by a switch 19 operated by a solenoid 20 in the motor starting circuit, which circuit is controlled by motor starting switch 7. The solenoid 20 is so wound that it is incapable of holding switch 19 closed throughout the continuance of the motor-starting circuit, but is sufficiently energized by the surge of current at the time the motor starting switch 7 is closed to lift the switch 19 momentarily and so close the auxiliary field circuit for perhaps one or two revolutions of the armature. The auxiliary field winding strengthens the field and increases the torque of the motor to overcome the inertia of the idle parts and is then immediately cut out of circuit so that it will not hinder the armature in quickly attaining its proper speed for cranking the engine.

Other means may be provided to establish a momentary contact at the time the motor starting circuit is closed providing an auxiliary field circuit controlled by such contact will accelerate the starting operation.

What I claim as new and desire to secure by Letters Patent is:

1. In a gas-engine-operated automatically controlled generating unit having a generator with windings for supplying mains, means for facilitating the starting of the engine by the generator acting as a motor with current from a materially lower voltage battery through said windings, comprising a shunt field winding constituting a field-stimulating coil auxiliary to said windings momentarily included in circuit on the closing of the motor starting circuit to momentarily stimulate the field strength.

2. In a gas-engine-operated generating unit, a generator having windings for supplying mains at a service voltage, means for permitting the starting of the engine by a materially lower voltage battery supplying current to said windings for operating the generator as a motor and comprising a shunt field coil auxiliary to said windings and included in circuit momentarily at the time of closing the starting circuit.

3. In a gas-engine-operated automatically controlled generating unit of the type wherein the generator having windings for supplying mains at a service voltage is utilized as a motor for starting the engine by a motor starting circuit including a materially lower voltage battery supplying current to said windings, means for stimulating the field strength momentarily at the time of starting comprising a shunt field winding auxiliary to the said windings and included in circuit on the closing of the motor starting circuit.

In testimony whereof, I affix my signature.

THOMAS S. WATSON.